United States Patent [19]

Meijer et al.

[11] 4,258,590

[45] Mar. 31, 1981

[54] WOBBLE PLATE CONTROL FOR A VARIABLE PISTON DISPLACEMENT MACHINE

[75] Inventors: Roelf J. Meijer, Ann Arbor; Benjamin Ziph, Ypsilanti, both of Mich.

[73] Assignee: U.S. Philips Corporation, New York, N.Y.

[21] Appl. No.: 63,645

[22] Filed: Aug. 3, 1979

[51] Int. Cl.³ .............................................. F16H 35/08
[52] U.S. Cl. ........................................ 74/839; 74/60; 91/506; 92/13.7; 123/58 BA
[58] Field of Search ............................. 74/60, 800, 839; 91/505, 506; 92/12.2, 13.7; 123/58 R, 58 A, 58 AA, 58 AB, 58 AM, 58 B, 58 BA, 58 BB, 58 BC, 48 R, 48 B; 417/222

[56] References Cited

U.S. PATENT DOCUMENTS

| | | | |
|---|---|---|---|
| 211,894 | 2/1879 | Dutton | 74/800 |
| 1,255,973 | 2/1918 | Almen | 123/58 BA |
| 1,819,715 | 8/1931 | LeBret | 123/58 BA |
| 2,926,735 | 3/1960 | Cook | 92/12.2 |
| 3,139,037 | 6/1964 | Budzich | 91/505 |
| 3,175,363 | 3/1965 | Molly | 91/506 |
| 3,292,554 | 12/1966 | Hessler | 91/506 |
| 3,304,886 | 2/1967 | Roberts | 417/222 |
| 3,369,412 | 2/1968 | McFarland et al. | 74/60 |
| 3,901,093 | 8/1975 | Brille | 123/58 R |

Primary Examiner—Lawrence J. Staab
Attorney, Agent, or Firm—David R. Treacy

[57] ABSTRACT

A variable angle wobble plate drive for varying piston displacement has constant velocity coupling from the wobble plate to the frame which permits all axis-dynamic balancing. The coupling uses an idler element rotating on a tilted axis portion of the shaft, and conical gear sets connecting the idler member to the machine frame and the idler member to the wobble plate. The sum of the acute angles from the tilted axis to the shaft, and to the driving axis, is made greater than the maximum driving angle thereby permitting low reaction torque on a driving angle control mechanism without reversal of control torque.

5 Claims, 3 Drawing Figures

WOBBLE PLATE CONTROL FOR A VARIABLE PISTON DISPLACEMENT MACHINE

BACKGROUND OF THE INVENTION

1. Field of the Invention

The invention relates to a wobble plate drive for a cluster of axially reciprocating pistons spaced about a shaft axis; and more particularly to such a drive in which the wobble plate tilt angle with respect to the shaft axis may be varied in order to vary the piston displacement. Drives of this type are known for hydraulic pumps and motors, and have been proposed for multi-cylinder thermodynamic engines, particularly of the hot gas type.

Because there is not complete uniformity of terminology in this art, the following definitions are applicable to the specification and appended claims.

Swash plate drive refers specifically to a drive having the bearings for reciprocating the individual pistons in direct contact with a swash plate driving surface that rotates with the shaft. In such a drive the connection between the piston rod or linkage and the swash plate has both a sliding or rolling relative movement with respect to the periphery of the swash plate, and an oscillating pivoted movement with respect to the swash plate. The piston (connecting) rods or linkage are normally constrainted to a purely axial motion. The sliding or rolling movement with respect to the swash plate is then along a surface having circular or elliptical symmetry about a swash plate axis. When the swash plate is tilted so that this axis intersects the shaft axis at a given non-zero angle, the oscillating pivotal movement is about a line which normally lies in a plane perpendicular to the swash plate axis, referred to herein as the driving plane.

A wobble plate drive is a drive having a plate or functionally equivalent member which is coupled through bearings to the bearing surface of a support member whose movement is the same as that of a swash plate driving surface rotating with the shaft. The wobble plate is restrained by a connection to the machine frame so that it does not undergo net rotation about the shaft axis, but merely has a wobbling motion. The wobble plate is connected to the connecting rods through some form of oscillating pivotal bearings whose axes define a driving plane.

2. Description of the Prior Art.

Swash plate drives for hydraulic machines have been in substantial commercial use for a number of years. Because of the high torques and power levels obtainable with hydraulic machines of relatively modest size, extremely rugged shafts and swash plate or wobble plate assemblies have been required. These in turn are mounted in heavy housings or cylinder assemblies. As a result only very small vibration amplitudes are transmitted to the machine mounting points.

Many of the known machines are completely unbalanced insofar as inertia forces caused by piston and piston rod movement and drive mechanism are concerned. For example, U.S. Pat. No. 3,175,363 teaches static balancing of an oblique disc used as a wobble plate, and dynamic balancing for overcoming the effect of sudden reduction in the hydraulic load. Dynamic balancing for the torque about an axis perpendicular to and rotating with the shaft due to the inertia of the pistons moving back and forth is not provided. Also, when the plane is tilted, a greater portion of the hemispheric mass is to one side of the shaft than the other, directly producing a radial imbalance.

The significance of radial imbalance has been appreciated and compensated for. For example, in U.S. Pat. No. 3,292,554 a mechanism is disclosed having a counterweight which moves radially to one side away from the shaft as the hemisphere is moved toward the other side of the shaft. However, the piston inertia forces are again neglected.

More recently, Stirling cycle engines for automotive use have been delivered to Ford Motor Company by N. V. Philips Gloeilampenfabrieken, incorporating a swash plate drive. These engines have a fixed driving plane tilt angle, and are balanced dynamically by choice of the swash plate mass and dimensions. However, because of the use of a plain swash plate, bearing design is complex and may be less easily maintained by average automotive mechanics then drives having standard bearing types.

A variable displacement wobble plate drive in which the inertia forces of the pistons may be counterbalanced is disclosed in copending U.S. application Ser. No. 904,529 filed May 10, 1978, and assigned to the assignee of the instant application. The mechanism disclosed therein overcomes many of the disadvantages of the prior art referred to above, but is still not fully balanced because the restraint mechanism for the wobble plate produces uncompensated pivoting moments.

SUMMARY OF THE INVENTION

An object of the invention is to provide a variable displacement wobble plate drive mechanism which may be fully balanced for dynamic forces and moments.

A further object of the invention is to provide such a drive mechanism for a Stirling cycle engine suitable for automotive propulsion, which may be made both compact and designed for low mechanical friction at low speed and high torque.

Yet another object of the invention is to provide a drive whose variable displacement control function is simplified mechanically but provides uni-directional loading on the control means over the entire operating range.

According to a first aspect of the invention a restraint for a wobble plate drive comprises an element fixed to the machine frame having a fixed conical surface arranged symmetrically about the shaft axis, and a wobble plate conical surface fixed to the wobble plate and arranged symmetrically about the tilted shaft axis, rolling contact on the conical surfaces forming a "constant velocity" joint or coupling between the wobble plate and the frame. This causes the wobble plate to have a constant angular velocity about the tilted axis. To permit this effect in a variable displacement wobble plate drive, in a machine according to this aspect of the invention contact between the two conical surfaces described above is made via an idler element mounted on the shaft for rotation about the shaft tilted axis, having first and second conical surfaces respectively arranged symmetrically about the tilted axis, the first surface engaging the fixed conical surface on the frame for relative rolling movement, and the second surface engaging the wobble plate conical surface for relative rolling movement, the driving angle of the wobble plate being determined by the relative angular position of a support member mounted on a tilted portion of the shaft. This aspect of the invention provides an extremely compact construction, which may be dynamically balanced for both the oscillating and rotating parts of the machine. In a preferred embodiment, each of the conical surfaces is formed by a conical gear, mating gears having like pitch and numbers of teeth.

According to a second aspect of the invention, in a variable displacement wobble plate drive having a constant velocity coupling between the wobble plate about the tilted axis and the machine frame about the shaft axis and a control element mounted on the shaft for limited angular movement about the tilted axis, the sum of the acute angle between the shaft axis and the tilted axis, and the acute angle between the tilted axis and the driving axis is made greater than the maximum driving angle (the tilt of the driving plate with respect to a plane perpendicular to the shaft axis); and the support member is rotated by the control element over a range in which the support member angle with respect to the shaft leads, in the direction of shaft rotation, the position of minimum driving angle. This provides a simplified stable control system, especially where hydraulic controls are utilized, because the torque required to maintain the driving angle is minimized yet is always in one direction and greater than zero.

DESCRIPTION OF THE PREFERRED EMBODIMENTS

Figure 1:
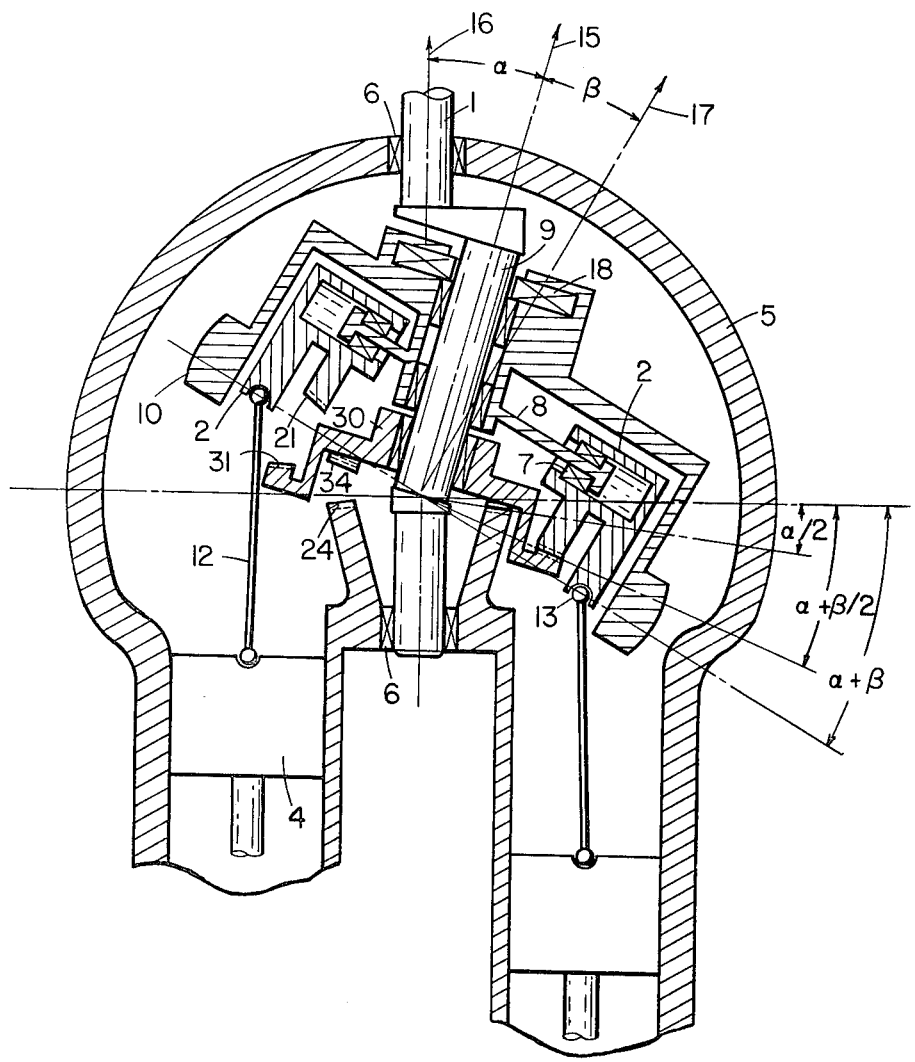
FIG. 1 is a schematic section of a portion of a thermodynamic engine according to the invention, the crank shaft and wobble plate being shown at the maximum driving angle.

FIG. 1 shows schematically a variable displacement wobble plate drive mechanism for a four cylinder thermodynamic engine, such as a Stirling cycle engine. Details of the pistons, cylinders, gas connections and the like which are known to those of ordinary skill in this art and do not form part of the present invention are not shown in this view. Machines of this type are known to include a shaft 1 which rotates within a wobble plate 2 when driven by piston cross-heads 4 which are connected to the pistons (not shown). These elements are mounted within a housing 5 which also supports main bearings 6 for the shaft 1. The wobble plate 2 is positioned via roller bearing elements 7 from a support 8 which is pivotally mounted on a tilted portion 9 of the shaft. Also rotating with the shaft and support is a balance ring 10 described in the copending application Ser. No. 904,529 referred to above, which counteracts inertial forces transmitted from the pistons and cross-heads 4 via connecting rods 12 to pivotal joints 13 on the wobble plate 2.

In order to vary the stroke of the pistons, and therefore the power developed by the engine, the shaft tilted portion 9 has its axis 15, hereinafter referred to as the tilted axis, arranged at an acute angle $\alpha$ from the shaft axis 16; and the support 8 has its bearing surfaces for the roller elements 7 arranged symmetrically about a driving axis 17 which is inclined at an angle $\beta$ with respect to the tilted axis 15, all three axes intersecting at a common point. The angular position of the support 8 about the shaft tilted portion 9 is controlled by a hydraulic motor 18, which in this embodiment is shown arranged on the shaft tilted portion within the crank case. This hydraulic motor, which may for example be a vane motor, is operated in conventional fashion by fluid passages in the crank shaft 1 from conventional control mechanisms to the exterior of the engine.

Except for the location of the hydraulic control element or motor 18 on the shaft tilted portion 9, the machine parts described above are essentially the same as those disclosed in the copending application Ser. No. 904,529 referred to above. According to a first aspect of applicants' invention, the wobble plate 2 is connected to the frame or housing 5 by a novel constant velocity joint or coupling incorporating conical surfaces such as gears and an idler element having mating conical surfaces such as gears. Formed directly on, or fixed to, the wobble plate 2 is a conical gear 21 formed along a conical surface symmetric about the driving axis 17 and having its apex at the common point at which the driving axis 17 and tilted axis 15 intersect, the cone having a half angle which is the complement of the angle $\frac{1}{2}\beta$. The other end of the constant velocity coupling is formed by a fixed conical surface or gear 24 formed on, or preferably fixed to, the machine frame or housing 5 near the common point at which the tilted axis 15 and shaft axis 16 intersect. The teeth of the gear 24 are aligned along the surface of a cone having its apex at the same common point, the cone half angle being the compliment of the angle $\frac{1}{2}\alpha$. Interconnecting the two fixed conical gears just described in an idler element 30 which is mounted on bearings on the shaft tilted portion 9, free to rotate about the tilted axis 15. The idler element 30 carries two conical gears or surfaces, a first conical gear 34 meshing with the fixed conical gear 24, and a second conical gear 31 meshing with the wobble plate conical gear 21. The first gear 34 has a pitch circle and number of teeth equal to that of the fixed gear 24, and the second gear 31 has a pitch circle and number of teeth equal to that of the wobble plate gear 21.

The theory and operation of the mechanism described above will be clear to those of ordinary skill in the mechanical arts. FIG. 1 shows the machine in the position at which the driving axis 17 has its maximum displacement, $\alpha + \beta$ from the shaft axis 16 so that the wobble plate 2 undergoes a maximum wobbling motion which corresponds to maximum displacement or stroke of the piston cross-heads 4 and the pistons (not shown). To reduce the displacement or piston stroke, for example in order to reduce the power output of a Stirling engine, pressurized hydraulic fluid is caused to operate the hydraulic control element or motor 18 which advances or retards the relative angular position of the support 8 with respect to the shaft 1. This actually rotates the support to a controlled angular position about the tilted axis 15, changing the point of contact between the second conical gear 31 and the wobble plate conical gear 21. As this relative rotation is continued the driving angle changes from a maximum value $\alpha + \beta$ toward a minimum value $\alpha - \beta$, during which time the wobble plate wobbles about the shaft axis 16 but without any rotation because the wobble plate is coupled to the machine frame or housing 5 through the idler element and conical gears. In steady state operation, the point of contact between the wobble plate gear 21 and the idler element gear 31 follows the rotation of the shaft 1, while the idler element undergoes a wobbling motion through the half angle $\alpha$ and the shaft rotates inside the idler element.

Figure 2:
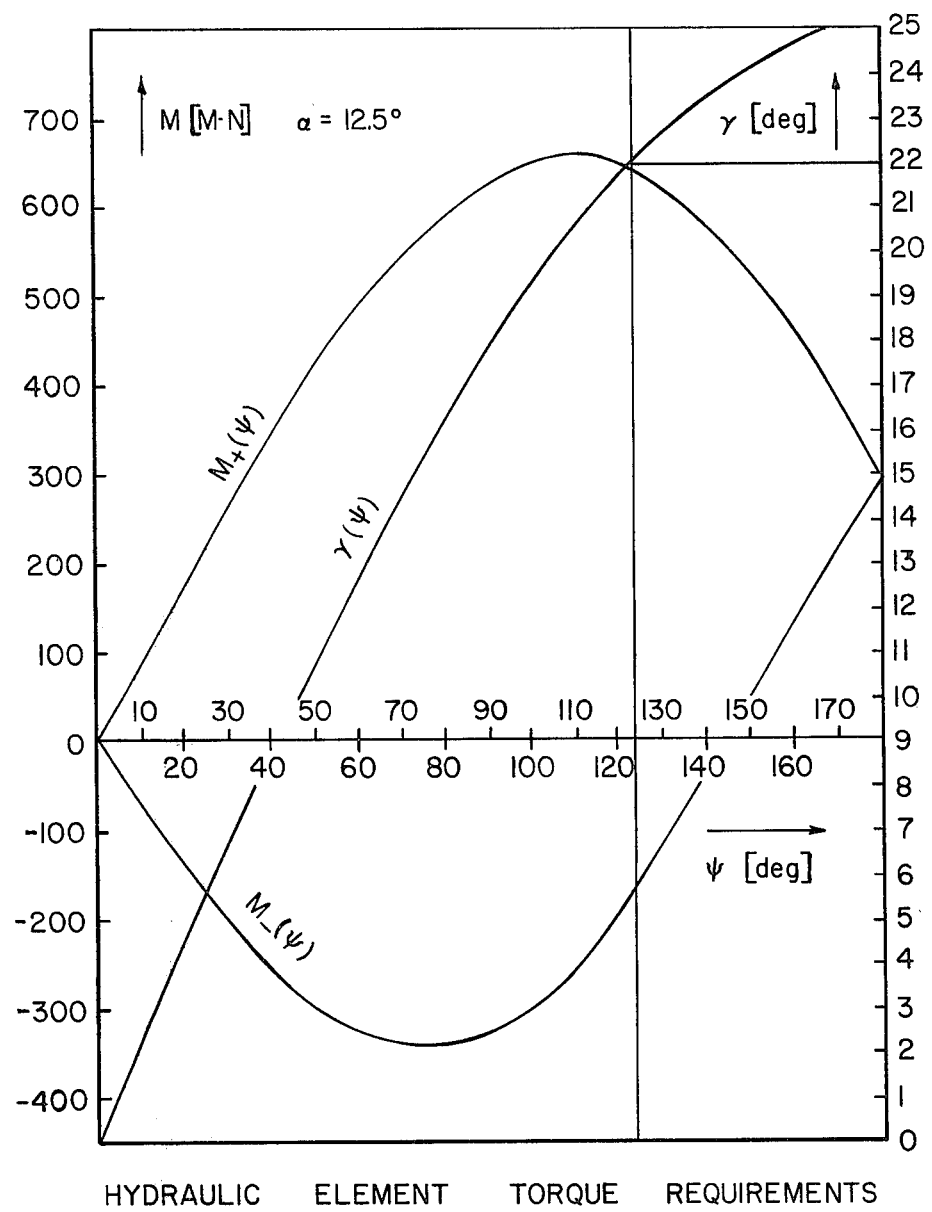
FIG. 2 is a graphical representation of the torque requirement for the control element for varying the displacement of the engine of FIG. 1.

The selection of the values for the angles $\alpha$ and $\beta$, and the direction in which the control element 18 rotates the support 8 from a position of minimum driving angle determine not only the magnitude of the torque required from the control elements, for a given set of piston forces, but also the sense of that torque. FIG. 2 shows a graph of the relationship between the driving angle $\alpha$ and the angle $\psi$, the angle $\psi$ being the angle by which the support member 8 is rotated from the position in which the driving angle is minimized at a value $\alpha - \beta$ (opposite that shown in FIG. 1) about the tilted axis 15. The curve $\gamma(\psi)$ is the same whether the support member is rotated in the direction of shaft rotation, that is, leading the shaft; or in the lagging direction. The upper curve $M_+(\psi)$ shows that a relative large control torque is required when the support member is rotated opposite to (lagging) the direction of shaft rotation with respect to the shaft from the position of minimum driving angle. The lower curve $M_-(\psi)$ shows only about half the torque required for the lagging range of angles and therefore the leading range would appear to be the far more desirable one in which to operate; but for equal values of the angles $\alpha$ and $\beta$ at 12.5°, it may be seen that when the angle $\psi$ exceeds 145° leading, the control torque actually reverses in direction. It will be recognized that this situation is very undesirable because of the difficulty in stabilizing a control servomechanism where the value of a steady state reaction torque not only reduces but actually passes through zero. Accordingly, according to this aspect of applicant's invention, the angles $\alpha$ and $\beta$ are each made sufficiently large that the range of rotation of the support member from the position of minimum driving angle is less than that at which the control torque becomes zero; in the preferred embodiment shown, a maximum driving angle $\gamma$ of 22° is provided, where the angles $\alpha$ and $\beta$ are each 12.5°, and the maximum rotation of the support member about the tilted axis, from the position of minimum (in this case, zero) driving angle is approximately 124°.

Where the amount of control torque available is sufficient for movement of the support in the lagging direction, this may be preferred because of the more linear relation of torque to the angle $\psi$.

Figure 3:
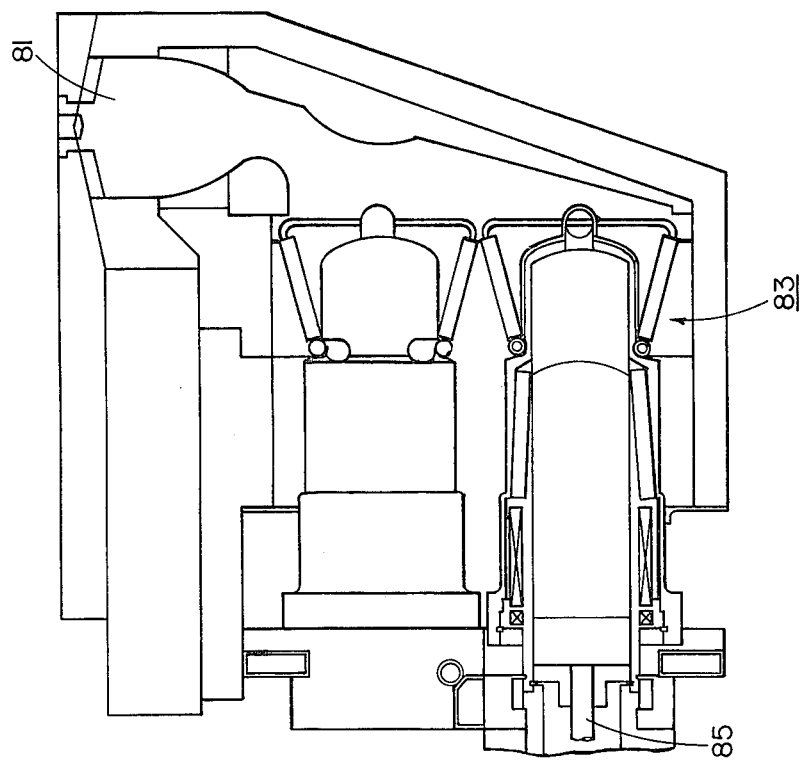
FIG. 3 is a simplified layout of a preferred embodiment of a Stirling engine suitable for automotive use, having an unpressurized crankcase.
Figure 3:
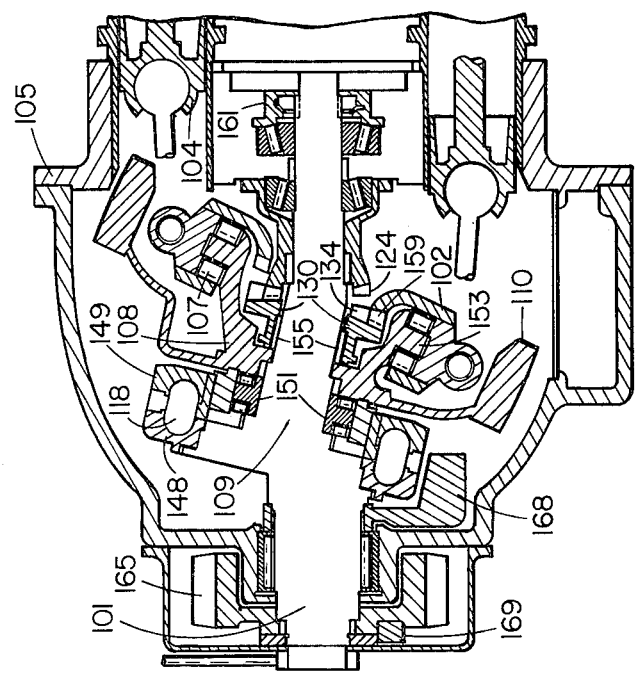

A simplified layout of a preferred embodiment of applicants' invention, applied to a Stirling engine suitable for automotive use and having an unpressurized crankcase, is shown in FIG. 3. For convenience, parts having the same function as corresponding parts shown in FIG. 1 have a reference numeral which is 100 higher than the corresponding FIG. 1 part. Heat from a combustion chamber 81 is transferred to working medium in the hot end 83 of a four cylinder double-acting Stirling cycle engine whose piston rods 85 are connected to cross-heads 104 in a housing 105 at the crankcase end of the machine. In order more accurately to portray the relationship of the parts, the crank case end of the machine is shown along a section line rotated 45° from the burner and cylinder end, the cross-heads 104 actually being axially aligned with the piston rods 85. This embodiment, which is both very compact and rugged, uses a hydraulic vane motor as the control element, a portion 148 being fixed to and rotating with the shaft 101 and a movable portion 149 being located by a roller bearing set 151 about the tilted portion 109 of the shaft, the movable portion 149 of the vane motor being fastened securely to the support member 108. The wobble plate 102 is mounted with respect to the support plate 108 on opposed roller bearing elements 107, and may preferably be positioned radially with respect to the support member by needle bearings 153.

In this embodiment the idler element 130 is made very compact, and is mounted on needle bearings 155 about the tilted shaft portion 109. The first conical gear 134 is located very close to the shaft, the fixed conical gear being formed on a sleeve extending into the crank case from the support for the main shaft roller bearings 157 which carry both thrust and radial loads. The engagement of the second conical gear on the idler element 130 with the wobble plate conical gear is shown at 159, along the same conical surface as the first conical gear 134 is located.

All the above needle and roller bearing sets, plus others not shown for simplicity, are lubricated from a common gear type oil pump 161 conveniently located within the space surrounded by the sleeves or the piston cross-heads 104. At the opposite end of the shaft, a drive sprocket 165 is provided on the shaft 101 for connection to a clutch and transmission assembly, this arrangment providing a compact transverse mounting of the engine for use such as in a front wheel drive car.

In addition to the balance ring 110, which as described in the copending application Ser. No. 904,529 counterbalances the moment of inertia of the reciprocating pistons, a main counterweight 168 and additional counterweight 169 are provided to cancel the mass eccentricity of the shaft, and to balance the moments of inertia due to motion of the shaft and idler gear. In this fashion complete balancing of all mass eccentricities and moments about all axes is provided.

Although most compact, the embodiment of FIG. 3 requires reciprocating rod seals to prevent leakage of the high pressure working medium past the piston and piston rod into the unpressurized crank case. To obviate the need for such seals, another preferred embodiment of the invention for use as an automotive Stirling engine involves the same wobble plate control and construction, but in a pressurized crank case having a rotating shaft seal between the tilted shaft portion and the output sprocket. To avoid having the full working medium pressure appear in the hydraulic control circuit, in such an embodiment the hydraulic motor or other actuator in the control circuit is located outside the crank case, connected by a concentric shaft sleeve to a conical gear or the like which meshes with a control element on the tilted shaft portion, the control element then being a conical gear or the equivalent.

It will be clear from the description of the embodiments given above that by the use of the instant invention compact, rugged, fully balanced engines having a variable displacement wobble plate drive may be provided. The use of a wobble plate enables the elimination of all sliding bearings, and the use of rolling contact bearings for all points having significant load enables operation of an engine in an efficient high torque, low speed mode which, for example, may eliminate the need for a torque converter in automotive applications. In wobble plate drives other than for a Stirling engine, if balancing of all moments and masses is advantageous, the instant invention enables the use of compact housings or frames which may therefore have sufficiently thick walls for great rigidity without excessive weight. There may also be applications, for example, where conical surfaces not having conventional gear teeth may provide sufficiently accurate and reliable alignment of the wobble plate, so long as the effect of a true constant velocity joint is maintained.

Many other design variations are possible within the spirit of the invention as measured by the appended claims. For example, there is no requirement that the angles α and β be equal, and for some applications it may be desirable that each be substantially greater than the values given for the preferred embodiment. Parts which are here shown to be supported directly one on the other may in some applications be indirectly supported so long as the basic functional relationship is maintained.

We claim:

1. In a variable displacement wobble plate drive machine having a frame; a shaft mounted for rotation about a shaft axis in the frame; a support member defining a driving axis arranged to intersect the shaft axis at a common point, said support member mounted for rotation with the shaft; means for varying the angle between the driving axis and the shaft axis; a wobble plate; and means connecting the wobble plate to the support member for wobbling movement of the plate responsive to the wobble of the driving axis as the shaft rotates, an improved wobble plate restraint mechanism wherein the support member is mounted for rotation about a tilted axis which intersects the shaft axis at said common point at a first acute angle, and the mechanism further comprises an element fixed to the frame and having a fixed conical surface arranged symmetrically about the shaft axis, an idler element mounted for rotation about the shaft on the tilted axis, having a first conical surface arranged symmetrically about said tilted axis and engaging said fixed conical surface for rolling movement of the first conical surface on the fixed conical surface as the shaft rotates, thereby forming a constant velocity coupling from the idler element to the frame; and a second conical surface arranged symmetrically about the tilted axis, and a wobble plate conical surface engaging said second conical surface for rolling movement of the wobble plate conical surface on the second conical surface as the angle between the driving axis and the shaft axis is varied, and the apices of said conical surfaces being disposed at said common point, thereby forming a constant velocity coupling from the wobble plate to the frame.

2. A mechanism as claimed in claim 1 wherein said conical surfaces are conical gear sets, the pitch and number of teeth of the first and fixed surfaces being respectively equal to each other, and the pitch and number of teeth of the second and wobble plate conical surfaces being respectively equal to each other.

3. A variable displacement wobble plate drive in a machine according to claim 2 wherein said means for varying the angle between the driving axis and the shaft axis comprises a control element mounted on the shaft for angular movement over a limited range about said tilted axis and connected to said support member for rotating the support member about the tilted axis, the support member having wobble plate orienting surfaces corresponding to the driving axis arranged at a second acute angle with respect to said tilted axis, said angular movement thereby selecting a driving angle, the sum of said acute angles is sufficiently greater than the maximum driving angle that reaction torque variation on the control element is minimized over said angular range.

4. A mechanism as claimed in claim 3 wherein said first and second acute angles are each approximately $12\frac{1}{2}°$, and said limited range is less than 145°.

5. A mechanism as claimed in claim 4 wherein said range is approximately 124°.

* * * * *

UNITED STATES PATENT AND TRADEMARK OFFICE
CERTIFICATE OF CORRECTION

PATENT NO. : 4,258,590

DATED : March 31, 1981

INVENTOR(S) : ROELF J. MEIJER ET AL

It is certified that error appears in the above—identified patent and that said Letters Patent is hereby corrected as shown below:

Claim 3, Line 29, after "angle," insert
--and--

Signed and Sealed this

Thirteenth Day of April 1982

[SEAL]

Attest:

GERALD J. MOSSINGHOFF

Attesting Officer    Commissioner of Patents and Trademarks